Jan. 16, 1962     O. G. LANDSVERK ETAL     3,017,511
FRICTION CHARGER AND DOSIMETER EMPLOYING THE SAME
Filed Aug. 11, 1958
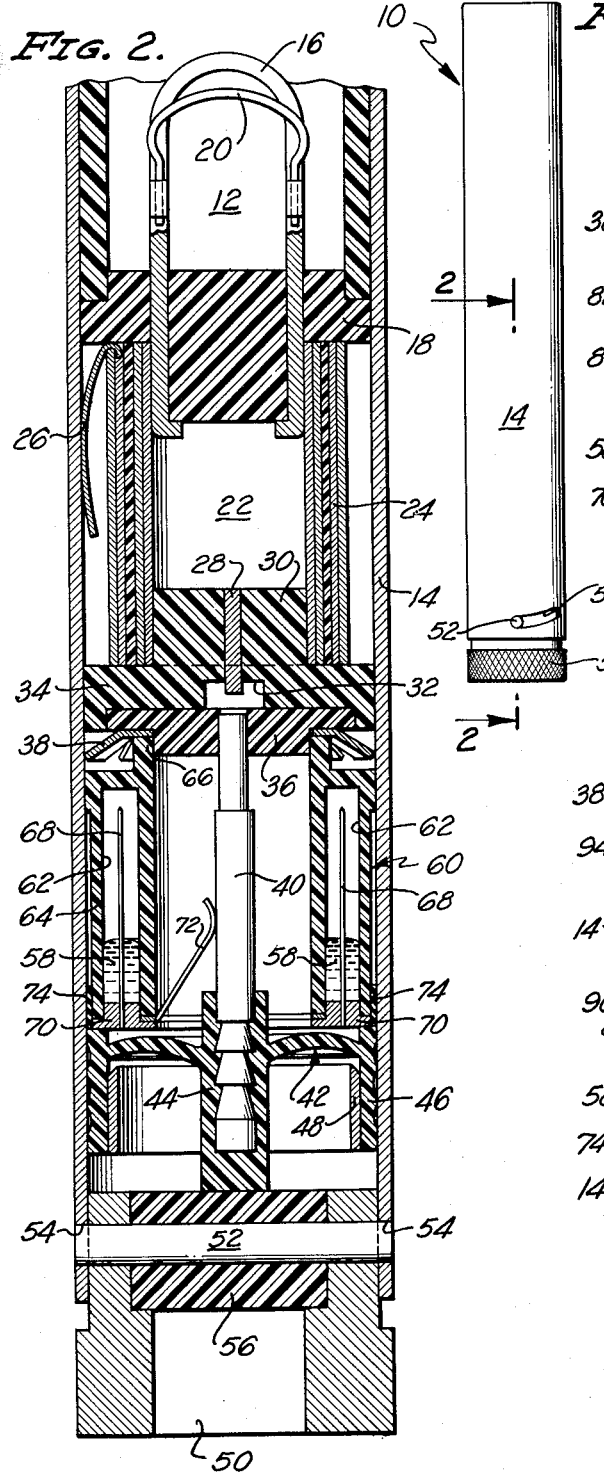
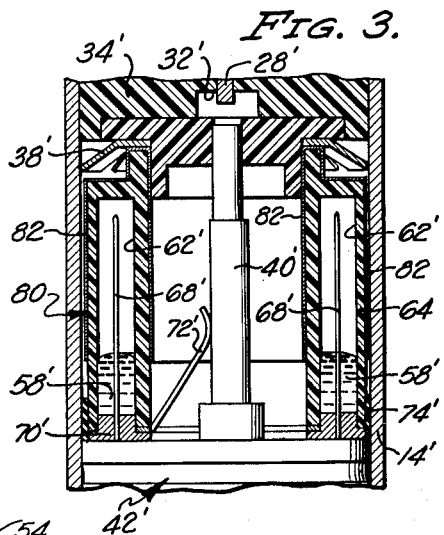
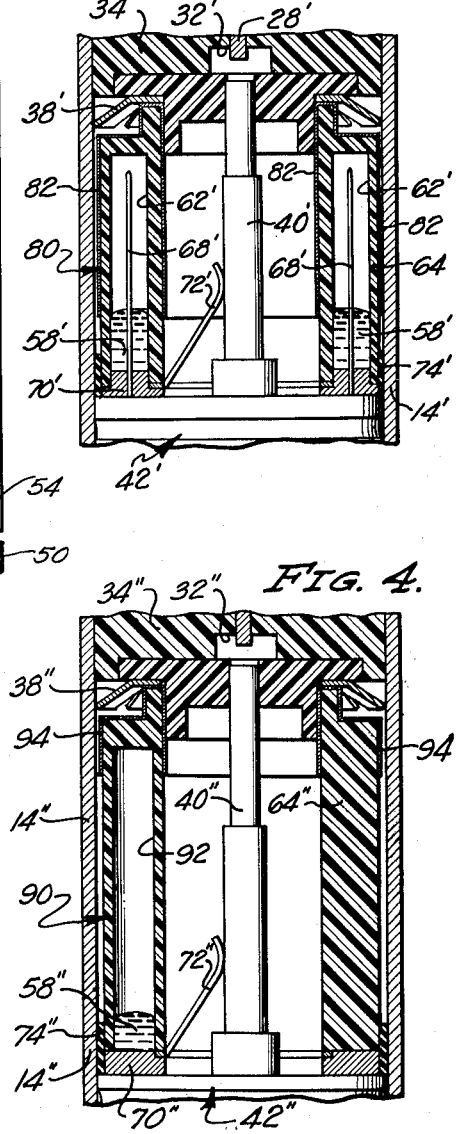
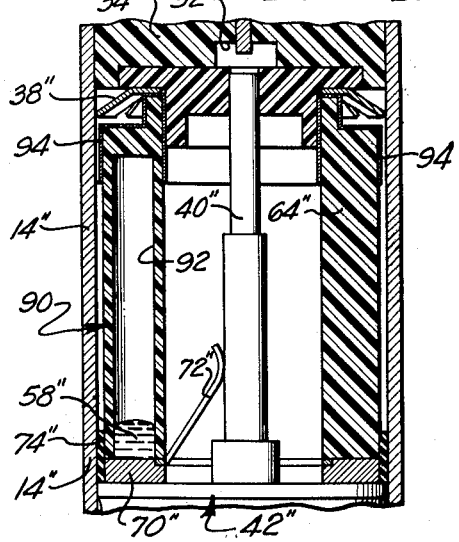
OLE G. LANDSVERK
ZENONAS GLODENIS
INVENTORS
BY *Edward D. O'Brien*
ATTORNEY

United States Patent Office 3,017,511
Patented Jan. 16, 1962

3,017,511
FRICTION CHARGER AND DOSIMETER
EMPLOYING THE SAME
Ole G. Landsverk, Glendale, and Zenonas Glodenis, Los Angeles, Calif., assignors to Landsverk Electrometer Company, Glendale, Calif., a corporation of California
Filed Aug. 11, 1958, Ser. No. 754,305
14 Claims. (Cl. 250—83.3)

This invention relates to new and improved friction chargers. More specifically it relates to friction chargers which are specifically adapted to be used in charging reading dosimeters.

A number of different types of friction chargers have been developed in the past. All of these devices are based on the fact that whenever two dissimilar surfaces are rubbed against one another that electrons will be released from atoms on one surface and will flow to the other surface. The development of electrostatic charges in this manner is indicated in virtually every elementary physics text. The reason why electrostatic charges can be developed in this manner is not completely understood at the present time. It is considered unnecessary in this specification to specifically indicate the present theory as to the development of electrostatic charges.

It is necessary, however, to understand something of prior friction chargers in order to understand this invention. In general, such prior devices can be divided into two types, direct charging friction chargers and indirect charging friction chargers. In these indirect friction chargers a conductor is normally located adjacent to a surface upon which charges are developed, but is insulated from this surface. During the operation of such friction chargers the development of a charge on a surface of the friction charger itself induces a charge on the conductor. With indirect chargers it is considered extremely difficult, if not impossible, to produce enough charging capacity by induction so as to charge various types of electrical instruments such as, for example, high range quartz fiber dosimeters and like devices. This is the case since such instruments frequently are constructed so as to have capacities of several thousand micro-microfarads.

With the direct type of electrostatic chargers a different type of problem is frequently encountered. As a result of both friction surfaces within such chargers being highly insulated the charges built upon these surfaces accumulate. As a result after these direct charging devices have been operated for a period of time one of the friction surfaces will repel any further electrons which the other surface will tend to give up to it. When this situation has been reached a friction charger is said to be "blocked" or to have "blocked itself." In larger direct charging friction chargers charges which have been built up in this manner on the surfaces of the charger are removed by attracting them to sharp points located adjacent to these surfaces or through the use of conducting filaments or the like. Such auxiliary devices in charging friction chargers tend to increase the size of these devices and tend to make them unnecessarily complex.

An object of the present invention is to provide new and improved friction chargers. Another related object of the present invention is to provide friction chargers which can deliver a relatively large electrical charge at a relatively high rate in relation to the dimensions of the charger itself. A further object of this invention is to provide friction chargers suitable for charging virtually all types of electrostatic instruments, which chargers are relatively simple to construct and which are relatively inexpensive to manufacture. A closely related object of this invention is to provide friction chargers as indicated which are very dependable in operation. Another object of this invention is to provide friction chargers which are used as an integral part of dosimeters, such as, for example, quartz fiber dosimeters of both high and low ranges.

Because of the nature of this invention it is not considered necessary to specifically set forth in this specification a further long list of various objects and advantages of it. Further objects and advantages of this invention will be fully apparent to those skilled in the art to which this invention pertains from a detailed consideration of the remainder of this description including the appended claims and the accompanying drawing in which:

FIG. 1 is a side elevational view of a dosimeter incorporating a friction charger of this invention;

FIG. 2 is a partial cross-sectional view of this dosimeter taken at line 2—2 of FIG. 1, showing in cross section a friction charger of this invention;

FIG. 3 is a view similar to FIG. 2 illustrating a modified friction charger of this invention; and FIG. 4 is a view similar to FIG. 2 of a further modified friction charger of this invention.

Whenever convenient for purposes of illustration and explanation like numerals have been used to designate like parts in the remainder of this description. The accompanying drawing is primarily intended so as to indicate several different presently preferred embodiments or forms of this invention. It will be realized, however, that sizes, shapes, etc. of friction chargers as herein described may be varied in accordance with routine engineering skill without departing from the essential nature or principles of this invention.

As an aid to understanding the invention it can be stated in essentially summary form that it involves friction chargers, each of which includes a member capable of conducting an electrostatic charge having an elongated passage formed in it. With this type of construction a conductive metal member is used so as to seal the end of this passage, and material is located within the passage so that it is capable of movement in it. As this material is moved contact between the surface of it and the surface of the passage causes the development of electrostatic charges on these surfaces.

For many reasons the above summary of the invention does not clearly indicate the complete nature of the invention. For this reason reference is made to the accompanying drawing for an illustration of several different embodiments of the inventive concept herein set forth. In FIGS. 1 and 2 of the drawing there is shown a dosimeter 10 of the general type or variety set forth in the co-pending U.S. patent application, Serial No. 645,059, filed March 11, 1957, now abandoned.

This dosimeter includes the usual microscope and recycle assembly (not shown) and an ionization chamber 12, all located within a tubular metal housing 14. A conductive metal frame 16 is held upon a non-conductive support 18 within the housing 14 so as to extend into the ionization chamber 12. This frame carries a quartz fiber 20 as indicated in the afore-noted co-pending U.S. patent application; the ends of the frame 16 are held tightly against a metal tube 22 connected to an electrode of a capacitor 24. The other electrode of this capacitor is connected by means of a spring-like clip 26 so as to be grounded to the housing 14. A wedge-shaped bar 28 is located so as to extend in an insulator 30 across the tube 22 and so as to extend into the inner cavity 32 formed in another insulator 34.

This insulator 34 and a guide 36 formed out of insulating material are held in place in the housing 14 by means of a spring-like retainer 38 formed out of any suitable conductive metal. A charging pin 40 is mounted upon a flexible diaphragm 42 as shown so as to extend from a center cylinder 44 of this diaphragm through the guide 36. The diaphragm 44 is provided with an outer cylindrical flange 46 which is held under compression against the interior of the housing 14 by means of a cylindrical retaining sleeve 48 in such a manner as to form a seal at all times.

In the dosimeter 10 a cap 50 is mounted at the lower end of the housing 14 so as to be capable of movement along the axis of this housing. This cap 50 carries a pin 52 which fits within two curved slots 54 located on opposite sides of the housing 14. These slots cause the cap 50 to move toward the other end of the housing 14 when it is turned from the position shown to a charging position. With this construction when the cap 50 is turned to this charging position, a center plug 56 in it bears against the cylinder 44 so as to force the charging pin 40 up against the bar 28. When the cap 50 is in this position the entire dosimeter 10 is ready to be charged.

This charging is accomplished by shaking the dosimeter 10 up and down so as to cause the movement of mercury 58 within a friction charger 60 up and down along the length of a cylindrical passage 62 extending along the length of a double walled cylinder 64. The passage 62 and this cylinder 64 are located around the charging pin 40 so that the end 66 of this cylinder 64 is held tight against the retainer 38.

As the mercury 58 moves up and down within the passage 62 electrostatic charges are developed on the surface of the mercury 58 and on the internal surfaces of the passage 62. The charge developed on this mercury is conveyed through any of a group of equally spaced metal wires 68 to a metal ring 70 sealing the end of the passage 62. From this ring 70 the charge on the mercury is conveyed through a flat metal brush 72 to the charging pin 40. As shown, the ring 70 is insulated from the housing by a small non-conductive cylinder 74.

As the friction charger 10 is operated the charge developed on the surface of the mercury is transmitted through the charging pin 40 to the capacitor 24 and thence to the frame 16 and the quartz fiber 20 causing a deflection of this fiber in a known manner. Because of the fact that the wires 68 extend almost the entire length of the passage 62 they serve to remove the charge from the mercury 58 at all times so as to prevent a build up of this charge. "Blocking" of this friction charger 60 is also prevented by some of the charge on the internal surface of the passage 62 leaking away to the housing 14 through the cylinder 64 and through the retainer 38. As a result of the fact that charges developed on the mercury 58 and on the surface of the passage 62 are constantly removed in this manner the entire friction charger 60 can be steadily operated as long as is necessary without the charger 60 becoming blocked.

In order to achieve satisfactory results with this type of structure it is preferred to form the cylinder 64 out of a material having a D.C. resistance of less than $10^{15}$ ohm cm. Preferred results have been achieved in using materials having a specific resistance within a range of from about $10^{10}$ to $10^{14}$ ohm cm. Suitable materials having resistance within this range are various grades of commercially available phenolic resins, certain grades of soda-lime glass. Other materials, of course, also fall within this range of values. It is possible to form the friction charger 60 so that the cylinder 64 is formed completely out of a conductive metal. In this case the principal portion of the cylinder 64 must be insulated from the ring 70; the cylinder must also be insulated from the housing 14 in order to prevent the charges built up on the inside of the passage 62 from being discharged too rapidly during the charging operation.

This is best explained by referring to the fact that during the charging operation the friction charger 60 will occasionally be operated so as to overcharge the complete instrument. With the type of construction described the charge on the quartz fiber 20 will gradually leak back through various parts of a dosimeter 10 and through the friction charger 60 to the housing 14 until the quartz fiber 20 is at an appropriate "0" setting. If an inadequate resistance is in the path taken by the charge during this discharging operation the quartz fiber 20 will drift past the "0" setting too rapidly and it is impossible to accurately set the position of the fiber 20 in a desired location by twisting the cap 50 to its initial position. If too high resistance is in the path taken by the charge the quartz fiber 20 will not move rapidly enough for convenience.

It is possible to use a wide variety of different materials instead of the mercury 58 within the friction charger 60. Thus, various other liquids, such as low melting point metal alloys may be used in the friction charger. It is also possible to substitute pellets such as, for example, methyl methacrylate or polystyrene pellets or to use finely divided pellets of aluminum, steel, glass or the equivalents. Generally it is not preferred to use such pellets, however, since their density is less than that of mercury and since the surface area available with them for friction contact is less than the area available with a liquid such as mercury. However, such pellets can be advantageously used where it is desired to provide a friction charger having a low output.

In FIG. 3 of the drawing there is shown a modified friction charger 80 of this invention which is essentially similar to the friction charger 60. For convenience of designation those parts of the charger 80 which are identical or substantially identical to corresponding parts of the charger 60 are designated by the primes of the numerals previously used.

The friction charger 80 is primarily intended to be used with high range dosimeters, such as, for example, dosimeters measuring up to 600 r. full scale and using a capacitor having a capacity of about 2000 micro-microfarads. In this charger 80 a conductive film 82 such as a conductive paint or a metal film is located around the outside of the cylinder 64' so as to lower the resistance between the passage 62' and the outside of the cylinder 64'. By this expedient the rate at which an overcharge on a quartz fiber can be conveyed to the housing 14 is increased. Also, this expedient decreases any tendency for the charger 80 to block itself during use.

For low range dosimeters it is frequently desired to use friction chargers such as the friction charger 90 shown in FIG. 4 of the drawing which are designed so as to produce a smaller charge than the friction charger 60. Since many parts of the friction charger 90 are identical or substantially identical to parts of the friction charger 60 these similar parts are identified by the double primes of the numerals previously used.

The friction charger 90 differs from the charger 60 in that the passage 62 extending completely around the charging pin 40" is replaced by a single tubular passage or hole 92 and in that no wires 68 are utilized. With this friction charger 90 a conductive film 94 is located on the end of the cylinder 64" and fits directly against the retainer 38" so as to be used in grounding this cylinder. Because of the fact that a comparatively small amount of mercury 58" moves within the charger 90 as it is shaken, and because of the fact that the charge on this mercury 58" is not taken off by wires such as wires 68, there is a tendency for this friction charger to block itself to some limited extent so as to obtain a controlled rate of charging as the charger 90 is employed.

From the preceding description it will be seen that the amount of charge obtained with any friction charger of this invention may be varied in several ways. One of these is by varying the length of the passage within which material moves. Another is by varying the physical dimensions of such a passage; still another way is by varying the use of means such as conductive films or wires as previously described which are designed so as to bleed off the charges developed. Still a further way is to vary the quantity of the material located within a passage in a friction charger of this invention. Obviously, of course, the nature of the material used in such passage will affect the amount of charge obtained.

Because of the fact that friction chargers as herein described can be varied in a number of ways as indicated above, and because of the fact that they may be mounted in dosimeters in a number of different manners this invention is to be considered as being limited only by the appended claims forming a part of this specification.

We claim:

1. A dosimeter which includes: a metal housing; an ionization chamber located within said housing; an electrode located within said ionization chamber, said electrode being insulated from said housing; a charging pin movably mounted within said housing, said charging pin being capable of being moved so as to place an electric charge on said electrode, said charging pin being insulated from said housing; a friction charger mounted in said housing, said friction charger including a first member capable of conducting an electrostatic charge and having a D.C. resistance of less than about $10^{15}$ ohm. cm., said first member having an elongated passage formed therein, a conductive metal member sealing an end of said passage, and a body of material located within said passage, said body being capable of movement within said passage so as to generate an electrostatic charge, said first member being in electrical contact with said metal housing so as to conduct an electrostatic charge to said housing, and means placing said conductive metal member in electrical contact with said charging pin.

2. A dosimeter as defined in claim 1 wherein said body of material is a body of mercury.

3. A friction charger which includes: a member having an elongated passage therein; a body of material located within said passage so as to be capable of movement along the length of said passage; at least one electrical conductor extending along the interior of said passage so as to be in electrical contact with said body of material during movement of said body of material within said passage; and means for electrically connecting said conductor to the exterior of said member.

4. A dosimeter which includes: a metal housing; an ionization chamber located within said housing; an electrode located within said ionization chamber, said electrode being insulated from said housing; a charging pin movably mounted within said housing, said charging pin being capable of being moved so as to place an electric charge on said electrode, said charging pin being insulated from said housing; a friction charger mounted in said housing, said friction charger including a first member having an elongated passage therein, a body of material located within said passage so as to be capable of movement along the length of said passage, at least one electrical conductor extending along the interior of said passage so as to be in electrical contact with said body of material during movement of said body of material within said passage, and means for electrically connecting said conductor to said charging pin.

5. A dosimeter as defined in claim 4 wherein said electrical conductor is a wire attached to said means so as to extend therefrom into the interior of said passage.

6. A friction charger which includes: a first member, said first member having an elongated passage formed therein and being formed of a material capable of conducting an elestrostatic charge; a second member, said second member being formed of a conductive metal and being located so as to be exposed to the interior of said passage and serving as one terminal for said charger; and a body of material located within said passage, said body being capable of movement within said passage and being capable of generating an electrostatic charge when moved within said passage; and another metal member in contact with the exterior of said first member so as to receive electrostatic charges conducted through said first member from the interior of said passage, said other member being insulated from said second member and serving as another terminal for said charger.

7. A friction charger as defined in claim 6 wherein said first member is formed of a material having a D.C. resistance of less than $10^{15}$ ohm centimeters.

8. A friction charger as defined in claim 7 wherein said body of material is a liquid.

9. A friction charger which includes: a member having an elongated passage formed therein, said member being formed of a material capable of conducting an electrostatic charge; a conductive metal member located at said passage; and a body of material located within said passages, said body being capable of movement within said passage and being capable of generating an electrostatic charge when moved within said passage; and metal wires attached to said metal member so as to extend into said passage, said wires being engaged by said body of material so as to serve to convey a charge developed on the surface of said body of material to said conductive metal member in order to prevent blocking of said friction charger.

10. A friction charger adapted to be shaken so as to develop an electrostatic charge, said friction charger including: a first member having an elongated passage formed therein, said first member being formed of a material capable of conducting an electrostatic charge, said passage having ends; a second member located at one of said ends of said passage, said second member being formed of a conductive metal; and a body of material located within said passage, said body being capable of being moved within said passage so as to generate an electrostatic charge as said friction charger is shaken; and another metal member in electrical contact with the exterior of said first member, said other member being insulated from said second member serving as another terminal for said charger and being capable of receiving electrostatic chargers conducted through said first member from the interior of said passage.

11. A friction charger as defined in claim 10 wherein said first member is formed of a material having a D.C. resistance of less than about $10^{15}$ ohm centimeters.

12. A friction charger as defined in claim 10 wherein said first member is formed of a material having a D.C. resistance of from about $10^{10}$ to $10^{14}$ ohm centimeters.

13. A friction charger adapted to be shaken so as to develop an electrostatic charge, said friction charger including: a member having an elongated passage formed therein, said member being formed of a material capable of conducting an electrostatic charge, said passage having ends; a conductive metal member located at one of said ends of said passage; a body of material located within said passage, said body being capable of moving within said passage so as to generate an electric charge as said friction charger is shaken; and at least one conductive metal wire attached to said metal member so as to extend therefrom into said passage, said wire being spaced from the walls of said passage, said wire being engaged by said body of material during the movement of said body of material within said passage and serving to convey a charge developed by the surface of said body of material to said conductive member.

14. A dosimeter which includes: a metal housing; an ionization chamber located within said housing; an electrode located within said ionization chamber, said electrode being insulated from said housing; a charging pin movably mounted within said housing, said charging pin being capable of being moved so as to place an electric charge on said electrode, said charging pin being insulated from said housing; a friction charger mounted in said housing, said friction charger including a first member having a D.C. resistance of less than about $10^{15}$ ohm centimeter, said first member having an elongated passage formed therein, a conductive metal member sealing an end of said passage, and a body of material located within said passage, said body being capable of movement within said passage so as to generate an electrostatic charge, said first member being in electrical contact with said metal housing, and means placing said conductive metal member in electrical contact with said charging pin; at least one wire attached to said metal member so as to extend into said passage.

References Cited in the file of this patent

UNITED STATES PATENTS

| | | |
|---|---|---|
| 2,622,207 | Rich | Dec. 16, 1952 |
| 2,731,568 | Failla | Jan. 17, 1956 |
| 2,741,707 | Futterknecht | Apr. 10, 1956 |
| 2,753,463 | Stout | July 3, 1956 |
| 2,761,073 | Carlbom | Aug. 28, 1956 |
| 2,805,345 | Warmoltz | Sept. 3, 1957 |

UNITED STATES PATENT OFFICE
CERTIFICATE OF CORRECTION

Patent No. 3,017,511                          January 16, 1962

Ole G. Landsverk et al.

It is hereby certified that error appears in the above numbered patent requiring correction and that the said Letters Patent should read as corrected below.

Column 6, line 39, for "chargers" read -- charges --.

Signed and sealed this 19th day of June 1962.

(SEAL)
Attest:

ERNEST W. SWIDER
Attesting Officer

DAVID L. LADD
Commissioner of Patents